US008346078B2

(12) United States Patent
Kusama

(10) Patent No.: US 8,346,078 B2
(45) Date of Patent: Jan. 1, 2013

(54) OPTICAL NETWORK EQUIPMENT AND OPTICAL NETWORK

(75) Inventor: Kazuhiro Kusama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/926,588

(22) Filed: Nov. 29, 2010

(65) Prior Publication Data

US 2011/0076015 A1 Mar. 31, 2011

Related U.S. Application Data

(63) Continuation of application No. 11/485,300, filed on Jul. 13, 2006, now Pat. No. 7,848,648.

(30) Foreign Application Priority Data

Jul. 15, 2005 (JP) .................................. 2005-206599

(51) Int. Cl.
H04J 14/00 (2006.01)
(52) U.S. Cl. ................. 398/45; 398/25; 398/33
(58) Field of Classification Search .................. 398/19, 398/25, 33, 45, 46
See application file for complete search history.

(56) References Cited

U.S. PATENT DOCUMENTS

| 6,871,024 B2 | 3/2005 | Nishimoto et al. | |
| 2002/0126337 A1* | 9/2002 | Uematsu et al. | 359/110 |
| 2003/0189933 A1 | 10/2003 | Ozugur et al. | |
| 2004/0076151 A1 | 4/2004 | Fant et al. | |
| 2004/0120714 A1 | 6/2004 | Fukashiro et al. | |
| 2005/0030951 A1 | 2/2005 | Maciocco et al. | |
| 2005/0031346 A1 | 2/2005 | Kakizaki et al. | |
| 2005/0213971 A1* | 9/2005 | Amemiya et al. | 398/45 |
| 2006/0029391 A1* | 2/2006 | Yuki et al. | 398/45 |
| 2006/0067694 A1 | 3/2006 | Nozu | |
| 2006/0228112 A1* | 10/2006 | Palacharla et al. | 398/45 |

FOREIGN PATENT DOCUMENTS

| CN | 1479460 A | 5/2003 |
| JP | 2002-208892 | 1/2001 |
| JP | 2005-064905 | 8/2003 |
| JP | 2005-323129 | 5/2004 |
| JP | 2006-074698 | 3/2006 |
| WO | WO-2005/032076 A1 | 4/2005 |

OTHER PUBLICATIONS

Chinese Patent Office Office Action on CN 1479460 A dated Jan. 9, 2009, in Chinese.
Office Action from Japanese Patent Office for Japanese Application No. 2005-206599 mailed Jul. 13, 2010.

* cited by examiner

Primary Examiner — Dzung Tran
(74) Attorney, Agent, or Firm — Crowell & Moring LLP

(57) ABSTRACT

A position in which an optical signal characteristic is compensated in an optical network can be chosen. An optical network equipment measures an optical signal characteristic for each wavelength, and notifies an optical network equipment on a communication path of an optical signal characteristic index and control necessity determination threshold. In an upstream portion of the communication path, the optical network equipment (a start point or the like of the communication path) that can compensate the optical signal characteristic for each wavelength determines the necessity to eliminate a deviation between wavelengths and the position to eliminate it, using the optical signal characteristic index and the control necessity determination threshold. The equipment determines a compensator to be controlled, and a compensation amount, based on the result, and commands an optical network equipment including the compensator to control the compensator, using a communication path establishment control protocol such as GMPLS-extended RSVP-TE.

14 Claims, 12 Drawing Sheets

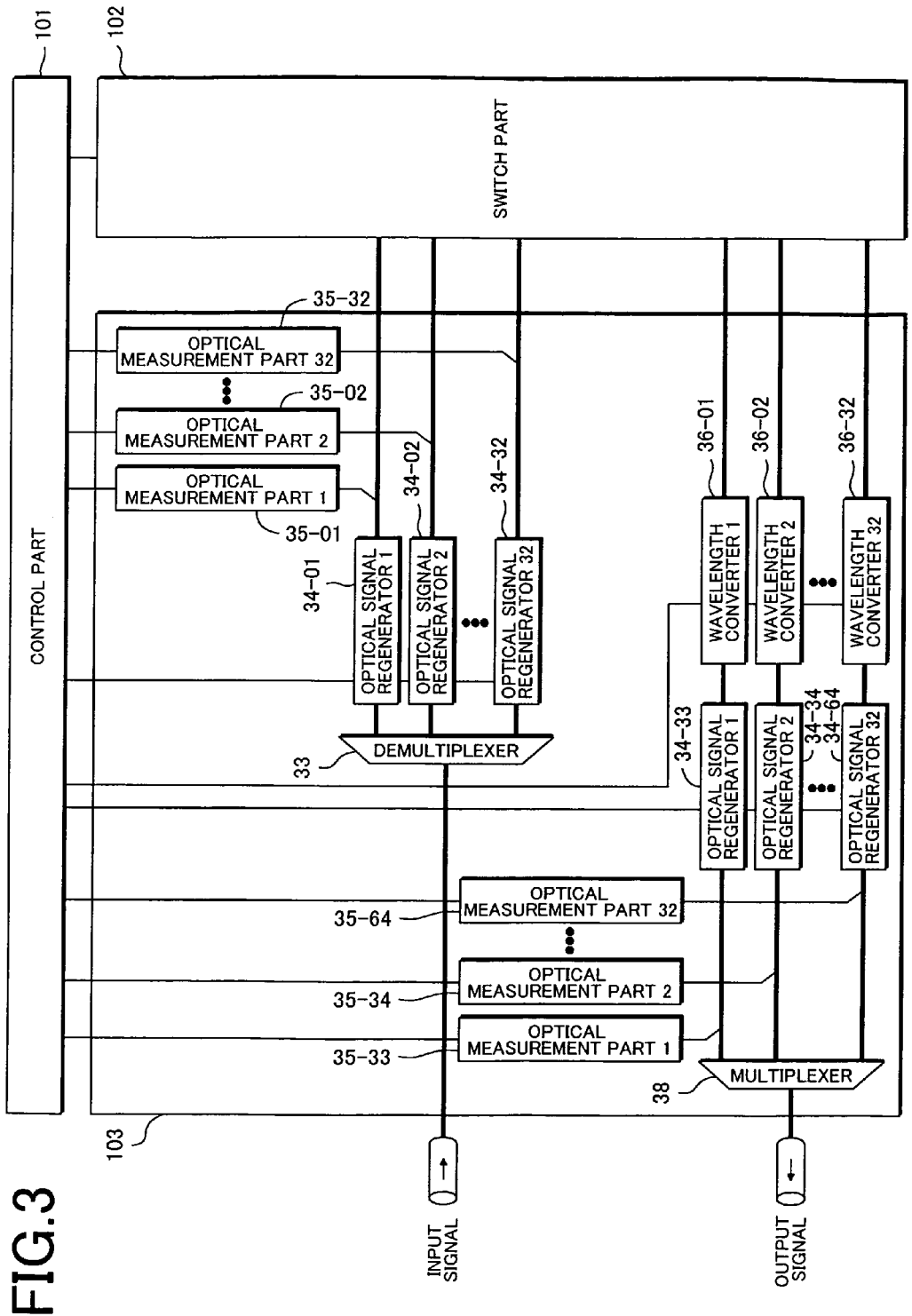

FIG.10

| UPSTREAM DEVICE | | DOWNSTREAM DEVICE | | |
|---|---|---|---|---|
| TYPE | LOCAL IDENTIFIER | TYPE | LOCAL IDENTIFIER | |
| inf | 1001, λ1 | power_meter | 1001, 1 | ⎫ |
| : | : | : | : | ⎬ 703 |
| inf | 1001, λ32 | power_meter | 1001, 32 | ⎭ |
| power_meter | 1001, 33 | inf | 1001, λ1 | ⎫ |
| : | : | : | : | ⎬ 704 |
| power_meter | 1001, 64 | inf | 1001, λ32 | ⎭ |
| regen | 1001, 33 | inf | 1001, λ1 | ⎫ |
| : | : | : | : | ⎬ 705 |
| regen | 1001, 64 | inf | 1001, λ32 | ⎭ |
| inf | 2001, λ1 | power_meter | 2001, 1 | ⎫ |
| : | : | : | : | ⎬ 706 |
| inf | 2001, λ32 | power_meter | 2001, 32 | ⎭ |
| power_meter | 2001, 33 | inf | 2001, λ1 | ⎫ |
| : | : | : | : | ⎬ 707 |
| power_meter | 2001, 64 | inf | 2001, λ32 | ⎭ |

OPTICAL NETWORK EQUIPMENT AND OPTICAL NETWORK

CLAIM OF PRIORITY

This application is a Continuation of U.S. patent application Ser. No. 11/485,300 filed on Jul. 13, 2006, now U.S. Pat. No. 7,848,648, which claims priority from Japanese application JP No. 2005-206599 filed on Jul. 15, 2005, the content of which is hereby incorporated by reference into this application.

FIELD OF THE INVENTION

The present invention relates to optical network equipments that constitute an optical network by switching optical signals, and particularly to optical network equipments that transfer optical signals without converting the optical signals into electrical signals, and an optical network system that guarantees the quality of the optical signals for an optical communication path established by the switching operation.

BACKGROUND OF THE INVENTION

Optical fibers and devices such as optical amplifiers, optical demultiplexers, optical multiplexers, and optical switches that are used to perform communications using optical communication paths have peculiar optical propagation characteristics, and influence the quality of optical signals transmitted. As technology for automatically compensating such propagation characteristics, a method of feedback-controlling dispersion compensators based on signal monitoring results in a receiving end is disclosed in patent document 1: Japanese Patent Laid-Open No. 2005-64905 and patent document 2: Japanese Patent Laid-Open No. 2002-208892.

SUMMARY OF THE INVENTION

Optical fibers and devices such as optical amplifiers, optical demultiplexers, optical multiplexers, and optical switches that constitute optical communication paths behave with optical propagation characteristics dependent on optical wavelengths, and behave nonlinearly to optical power. As optical signals pass through these optical devices, the signals deteriorate gradually, resulting in the occurrence of a transmission error in communication data.

Optical propagation characteristics are represented by indexes such as S/N ratio, chromatic-dispersion of group velocity, polarization mode dispersion, optical power, and Q factor, and keeping these indexes within given values is necessary to correctly transmit communication data.

For this reason, it is necessary to compensate deteriorating optical signals. For this purpose, dispersion compensators, optical amplifiers, and optical signal regenerators of optical 2R (Reshaping and Re-amplification) type or optical 3R (2R and Retiming) type are used.

Conventional optical transmission systems, which simply connect a start point and an end point, target point-to-point data transmission, and cannot change transmission destinations and transmission routes. To transfer data to a desired destination or change the route, it has been necessary to additionally combine a device for electrically switching transfer channels. As devices for switching channels, IP (Internet Protocol) routers, MPLS (Multi-Protocol Label Switching) switches, ATM (Asynchronous Transfer Mode) switches, and TDM-DXC (Time-Division Multiplexing Digital Cross Connect) devices are used.

In such a communication network, since an end point and a route of an optical transmission line are fixed, the setting of compensators has been comparatively easy. However, with the method of switching lines by electrical means, as communication speeds increase, the devices become more complicated and more expensive. Therefore, one optical transmission line is constituted by plural wavelengths so that one communication path is formed for each wavelength, and yet channels are switched in units of optical wavelengths. Optical network equipments having such a construction are being developed, such as OXC (Optical Cross Connect), PXC (Photonic Cross Connect), and OADM (Optical Add-Drop Multiplexer).

To constitute an optical network by using optical network equipments, each time an optical signal is relayed in the optical network, it is temporarily converted into an electrical signal, and then regenerated. This is called an optical-electrical-optical (O-E-O) conversion system. As another system, the optical signal is subjected as it is to optical signal regeneration without being converted into an electrical signal. Optical networks that do not perform optical-electrical-optical conversion are referred to as all optical networks. When optical-electrical-optical conversion is performed, an end point and a route of an optical transmission section are fixed, while, in all optical networks that do not perform optical-electrical-optical conversion, an end point and a route of an optical transmission section, and route length change.

As control technique for setting a channel in an optical network, GMPLS (Generalized MPLS), ASON (Automatic Switched Optical Network), and the like have been adopted. In networks that employ these, a path through which an optical signal passes without being converted into an electrical signal, and its length may change dynamically due to traffic optimization and recovery from path failure even when a communication path is being established.

In such a case where a path through which an optical signal passes without being converted into an electrical signal, and its length may change dynamically, optical propagation characteristics must be compensated for each of the communication paths that have changed. Furthermore, in an optical network that uses plural wavelengths and uses WDM (Wavelength Division Multiplex) constituting an optical communication path for each wavelength in an intermediate hop, compensation must be made considering deviations between plural optical communication paths that pass through same optical fibers and optical devices.

For example, in a case where optical power is compensated by an optical amplifier, when the deviation of levels between plural wavelengths that enter an identical optical amplifier becomes large, an S/N ratio (signal/noise ratio) deteriorates for wavelength of a lower level, while distortion occurs for wavelength of a higher level, resulting in the occurrence of a transmission error in communication data. Moreover, when distortion occurs in optical fibers and optical amplifiers, an unnecessary spectrum may occur due to a nonlinear effect caused by the distortion, causing a transmission error. The patent document 1 and the patent document 2 do not mention such a problem and solutions to it.

In an optical network that adopts WDM, optical network equipments connected with each other via optical fibers generally comprise an interface part connected to the optical fibers, a switching part for switching communication paths, and a control part that controls the operation of the switching part. Furthermore, the interface part includes optical devices such as optical amplifiers, demultiplexers, and multiplexers.

When compensation is made in such an optical network, by temporarily separating wavelengths to make compensation for each wavelength by a compensator, it is avoided that plural wavelengths having a deviation are inputted into an identical optical device. However, compensators are generally expensive, and if compensation is made for each wavelength in all optical network equipments disposed in communication paths, the cost of the entire network would increase.

An object of the present invention is to provide an optical network equipment that can choose a position in which an optical signal characteristic is compensated in an optical network, and an optical network that uses the optical network equipment.

An optical network equipment of the present invention for achieving the above-described object comprises an interface part connected to an optical fiber, a switching part that sets a communication path by switching over the connectivity to an input or output optical signal of the interface part, an optical signal measuring unit that measures the characteristic of the optical signal, and a control part that controls the operation of the switching part using a communication path establishment control protocol for exchanging a control message for establishing the communication path with other network equipment, wherein a measured value obtained by the optical measuring unit is exchanged with the other optical network equipment by the communication path establishment control protocol. Since the measured value is exchanged among the optical network equipment, the individual optical network equipment does not make compensation independently of each other, compensation can be made in view of the whole of optical paths established in the optical network, and it becomes possible to choose the position in which compensation is made in the optical network. Therefore, the number of optical signal regenerators that influence costs can be properly determined, so that the optical network can be brought down in cost.

According to the present invention, in an optical network constituted by plural optical network equipments, optical signal regenerators that compensate optical signal characteristics can be chosen without having to be included in all optical network equipments.

These and other objects and many of the attendant advantages of the invention will be readily appreciated as the same becomes better understood by reference to the following detailed description when considered in connection with the accompanying drawings.

BRIEF DESCRIPTION OF THE DRAWINGS

FIG. 3 is a block diagram for explaining an edge interface part used in an optical network equipment of this embodiment;

FIG. 10 is a drawing for explaining the structure of an interface configuration management table;

DETAILED DESCRIPTION OF THE PREFERRED EMBODIMENTS

Figure 1:
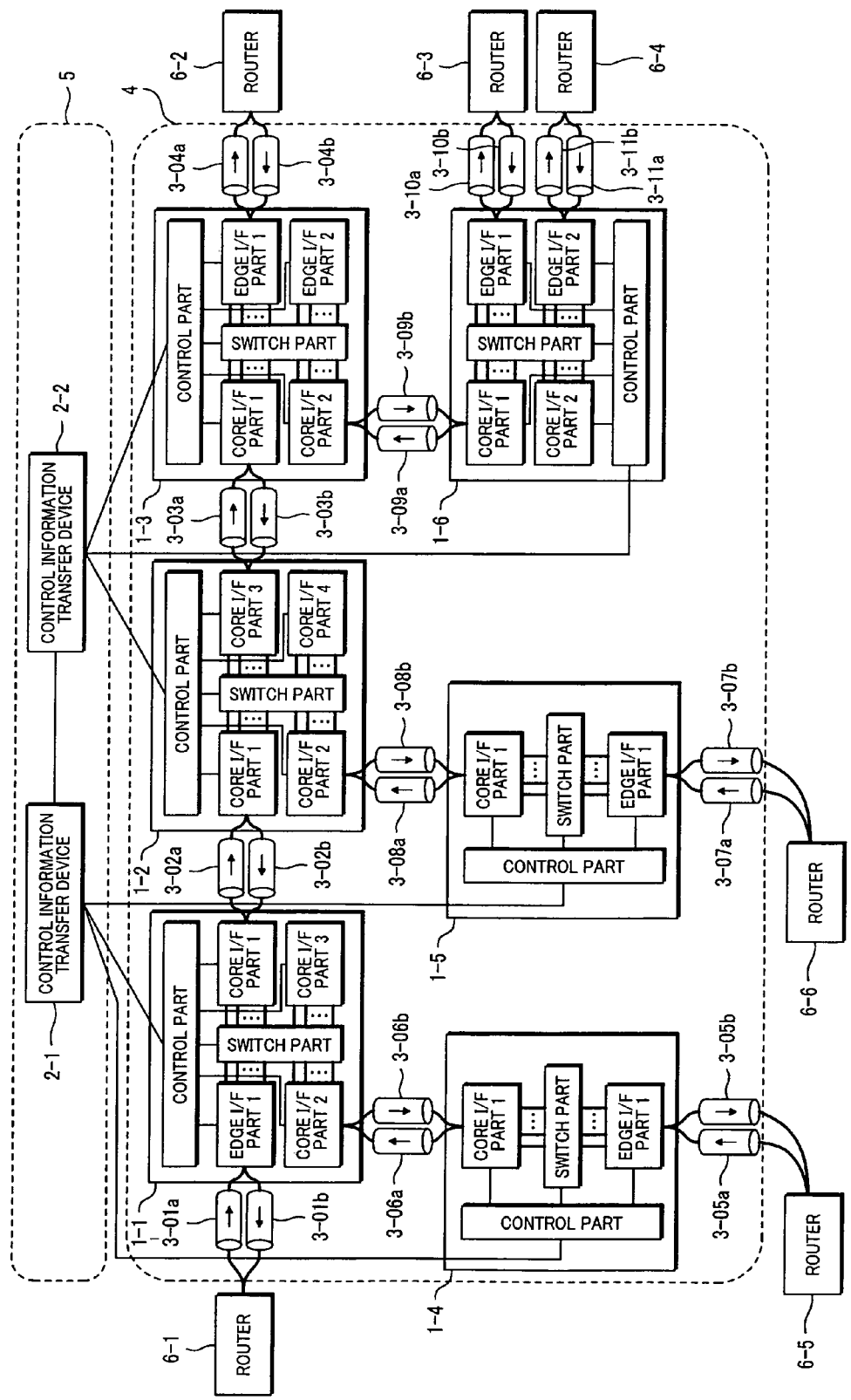
FIG. 1 is a block diagram for explaining an embodiment of optical network equipment according to the present invention, and a network that uses them.

Hereinafter, an optical network equipment according to the present invention and an optical network employing it will be described in more detail with reference to an embodiment shown in the accompanying drawings. In the drawings used to describe the embodiment, same reference numerals are given to same items or similar items.

In this embodiment, a communication path establishment control signal is described on the assumption of use of GMPLS (Generalized Multi-Protocol Label Switching)-extended RSVP-TE (Resource Reservation Protocol-Traffic Engineering), which is a protocol IETF RFC3473 formulated by IETF (Internet Engineering Task Force) being an international organization of the Internet. However, the present invention is applicable to other protocols such as CR-LDP (Constraint-based Routed Label Distribution Protocol) being protocol IETF RFC3472, and ASON being protocol ITU-TG.7713/Y.1704 formulated by ITU-T (International Telecommunication Union-Telecommunication Standardization Sector).

First, the configuration of an optical network that uses optical network equipment of this embodiment is described with reference to FIG. 1. In FIG. 1, an optical network 4 comprises optical network equipments 1-1 to 1-6 mutually connected by optical fibers 3-01*a* to 3-11*b*. Routers 6-1 to 6-6 serving as repeaters in the Internet are connected to the optical network 4. In this embodiment, the optical network 4 is configured by six optical network equipments and 24 optical fibers. However, the number of the optical network equipments and the topology of the optical network 4 are arbitrary. The optical fibers are used in a pair of up direction and down direction, such as optical fibers 3-01*a* and 3-01*b*.

The optical network equipments 1-1 to 1-6 exchange mutually exchange GMPLS-extended RSVP-TE messages with each other via a control information transfer network 5, whereby an optical path is established. The established optical path is used by the routers 6-1 to 6-6.

The control information transfer network 5 comprises control information transfer devices 2-1 and 2-2. Communication devices such as IP routers and Layer-2 switches can be used as the control information transfer devices 2-1 and 2-2. In this embodiment, although the control information transfer network 5 is configured by two control information transfer devices, the number of the control information transfer devices 2 and the topology of the control information transfer network 5 are arbitrary.

The optical network equipments 1-1 to 1-6 are identified by identifiers 192.168.1.1 to 192.168.1.6, respectively.

The configuration of the optical network equipments 1-1 to 1-6 is described with reference to FIGS. 2A and 2B. The optical network equipments 1-1 to 1-6 are classified as edge switch type and core switch type. Those of the edge switch type transmit and receive optical signal to and from the routers 6 or/and other optical network equipments 1, and those of the core switch type transmit and receive optical signal to and from only other optical network equipments 1. The optical network equipments 1-1, and 1-3 to 1-6 are the edge switch type, and the optical network equipment 1-2 is the core switch type.

Figure 2A:
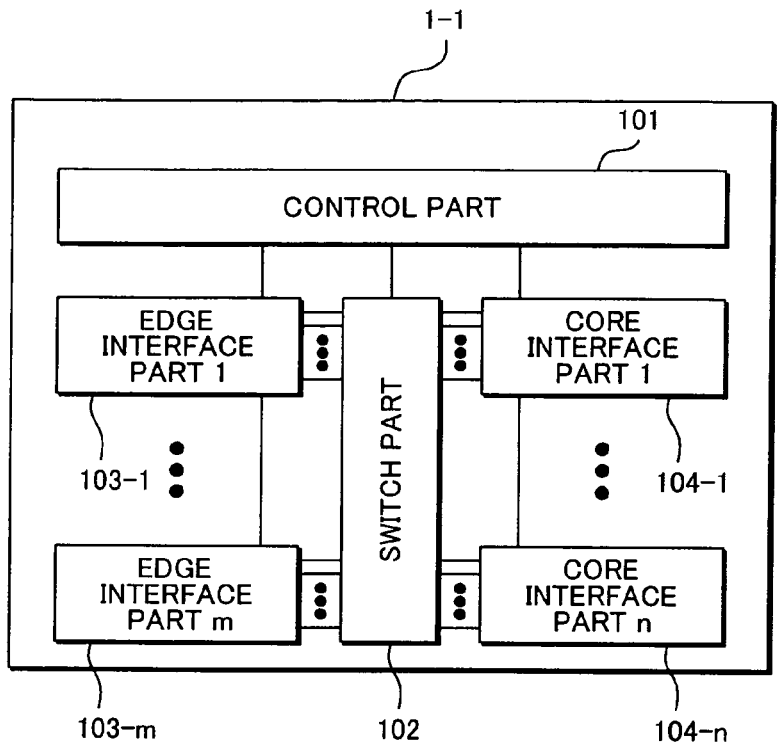
FIG. 2A is a block diagram for explaining an optical network equipment of this embodiment.

FIG. 2A shows a configuration of the optical network equipments 1 of the edge switch type. In FIG. 2A, the optical network equipments 1 of the edge switch type comprise at least one of edge interface parts 1 to m (103-1 to 103-m), at least one of core interface parts 1 to n (104-1 to 104-n), a switching part 102), and a control part 101. The optical fibers 3 are connected to the interface parts 103 and 104, and a communication path is established by the switching part 102 that performs switching (switching over the connectivity) to input/output optical signals of the interface parts 103 and 104. The operation (exchange) of the switch part 102 is controlled by the control part 101. GMPLS-extended RSVP-TE messages are interpreted by the control part 101.

Figure 2B:
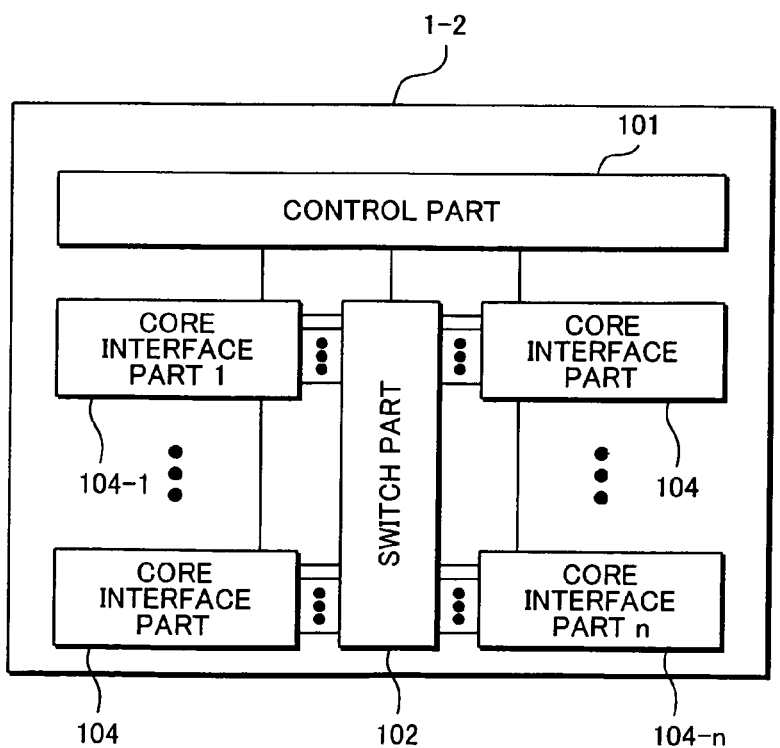
FIG. 2B is a block diagram for explaining another optical network equipment of this embodiment.

FIG. 2B shows a configuration of the optical network equipment 1 of the core switch type. In FIG. 2B, the optical network equipment 1 of the core switch type, having no edge interface part, comprises at least one of the core interface parts 1 to n (104-1 to 104-n), the switching part 102, and the control part 101. The optical fibers 3 are connected to the interface parts 103 and 104, and a communication path is established by the switching part 102 that performs switching (switching over the connectivity) for input/output optical signals of the interface parts 103 and 104. The operation (exchange) of the switch part 102 is controlled by the control part 101. GMPLS-extended RSVP-TE messages are interpreted by the control part 101.

In this embodiment, 32 wavelengths are multiplexed. The present invention is not limited to it, and the number of multiplexed wavelengths depends on a wavelength multiplexing system. The number of multiplexed wavelengths may differ for different links.

Identifiers are given to the edge interface parts (edge I/F parts) and the core interface parts (core I/F parts) of the optical network equipments 1, respectively. In the optical network equipment 1-1, 1001 is given to one edge I/F part, and 2001 to 2003 are given to three core I/F parts 1 to 3, respectively. In the optical network equipment 1-2, 2001 to 2004 are given to four core I/F parts 1 to 4, respectively. In the optical network equipments 1-3 and 1-6, 1001 and 1002 are given to two edge I/F parts, respectively, and 2001 and 2002 are given to two core I/F parts 1 and 2, respectively.

The hardware configuration of the edge interface parts 1 to m (103-1 to 103-m) is described with reference to FIG. 3. Each of the edge interface parts 103 comprises a demultiplexer 33, optical signal regenerators 34-01 to 34-64, optical signal measuring units 35-01 to 35-64, wavelength converters 36-01 to 36-32, and a multiplexer 38.

The demultiplexer 33 receives an optical signal from the routers 6 via the optical fibers 3, separates the received optical signal by wavelength, and transmits the separated optical signal to the optical signal regenerators 34-01 to 34-32. The optical signal regenerators 34-01 to 34-32 regenerate the optical signal by the optical signal regenerators of 2R type that perform wave shaping and amplification, or the optical signal regenerators of 3R type that perform wave shaping, amplification, and retiming, and transmit the regenerated optical signal to the switching part 102. The switching part 102 transmits the optical signal to a core interface part 104 or other edge interface part 103 that corresponds to an established optical path. The optical signal measuring units 35-01 to 35-32 measure the optical signal characteristics of the optical signal regenerated by the optical signal regenerators (34-01 to 34-32), and transmit a measured value to the control part 101. The optical signal regenerators 34-01 to 34-32 are controlled to set a compensation value of the optical signal characteristics by the control part 101.

The wavelength converters 36-01 to 36-32 receive the optical signal from the core interface part 104 or other edge interface part 103 via the switching part 102, convert the received optical signal into a wavelength corresponding to the optical path established according to a command from control part 101, and transmit the optical signal-length to the optical signal regenerators 34-33 to 34-64. The optical signal regenerators 34-33 to 34-64 regenerate the signal by the 2R type or 3R type and transmit the regenerated signal to the multiplexer 38. The multiplexer 38 multiplexes in wavelength the plural received optical signals and transmits the multiplexed signal to the router 6 via the optical fibers 3. The optical signal measuring units 35-33 to 35-64 measure the optical signal characteristics of the regenerated optical signal, and transmit a measured value to the control part 101.

In this embodiment, in the edge interface parts 103, after an optical signal is separated by wavelength by the demultiplexer 33, the 32 wavelengths is supplied to the optical signal regenerators 34-01 to 34-32, respectively. Therefore, optical signal characteristics are compensated on a wavelength basis. A target of compensation is optical power of the optical signal, and a control parameter is a gain of an optical amplifier of the optical signal regenerators 34.

Figure 4:
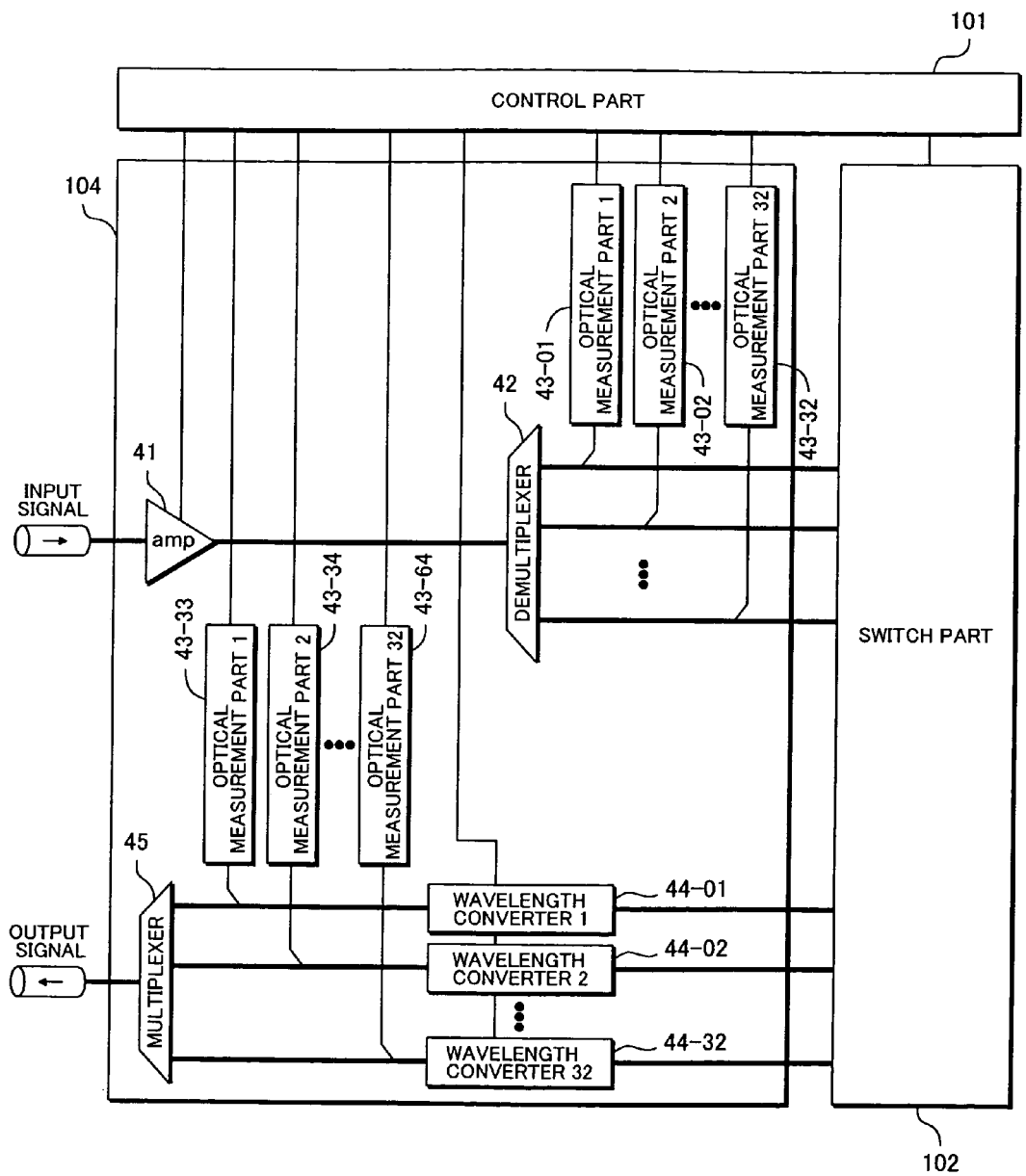
FIG. 4 is a block diagram for explaining a core interface part used in an optical network equipment of this embodiment.

The hardware configuration of the core interface parts 1 to m (104-1 to 104-m) is described with reference to FIG. 4. Each of the core interface parts 104 comprises an optical amplifier 41, a demultiplexer 42, optical signal measuring units 43-01 to 43-64, wavelength converters 44-01 to 44-32, and a multiplexer 45.

The optical amplifier 41 receives and amplifies an optical signal from the core interface parts 104 of other optical network equipments 1 via the optical fibers 3, and transmits the amplified optical signal to the demultiplexer 42. The gain of the optical amplifier 41 is set to such an amount as to cancel out the attenuation of the optical fibers 3 in a preceding stage and the switching part 102. The demultiplexer 42 separates the optical signal by wavelength, and transmits the separated optical signal to the switching part 102. The switching part 102 transmits the optical signal to an edge interface part 103 or other core interface part 104 that corresponds to an established optical path. The optical signal measuring units 43-01 and 43-32 measure the optical signal characteristics of the wavelength-separated optical signal, and transmits a measured value to the control part 101.

The wavelength converters 44-01 to 44-32 receives an optical signal from the core interface part 104 or the edge interface parts 103 via the switching part 102, converts it into a wavelength corresponding to an optical path established according to a command from the control part 101, and transmits it to the multiplexer 45. The optical signal measuring units 43-33 to 43-64 measure the optical signal characteristics of the optical signal subjected to wavelength conversion, and transmits a measured value to the control part 101. The multiplexer 38 multiplexes in wavelength the plural received optical signals and transmits the multiplexed signal to the core interface parts 104 of other network equipments 1 via the optical fibers 3.

As described above, in this embodiment, since the optical amplifier 41 is disposed before the demultiplexer 42 separates an optical signal by wavelength, optical signal characteristic compensation on a wavelength basis performed in the edge interface part 103 is not performed in the core interface part 104.

Figure 5:
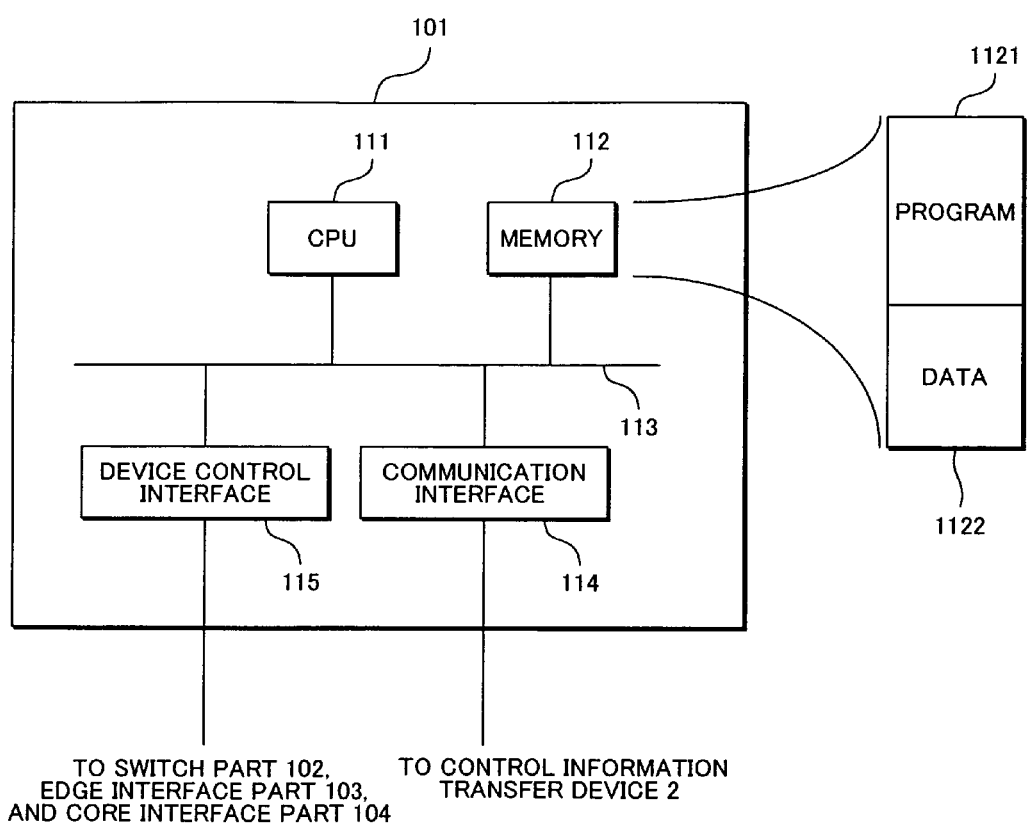
FIG. 5 is a block diagram for explaining a control part used in an optical network equipment of this embodiment.

The following describes the hardware configuration of the control part 101 of the edge interface parts 103 and the core interface parts 104, with reference to FIG. 5. The control part 101 comprises a CPU 111, a memory 112, an internal communication line 113 such as a bus, a communication interface 114, and a device control interface 115.

The communication interface 114, connected to the control information transfer device 2, exchanges GMPLS-extended RSVP-TE messages with other optical network equipments 1. The device control interface 115, connected with the switching part 102, the edge interface parts 103, and the core interface parts 104, controls them or receives optical signal characteristic measurement values. The memory 112 is stored with a program 1121 and data 1122. The CPU 111 controls the communication interface 114 and the device control interface 115 according to a procedure described in the program 1121.

Figure 6:
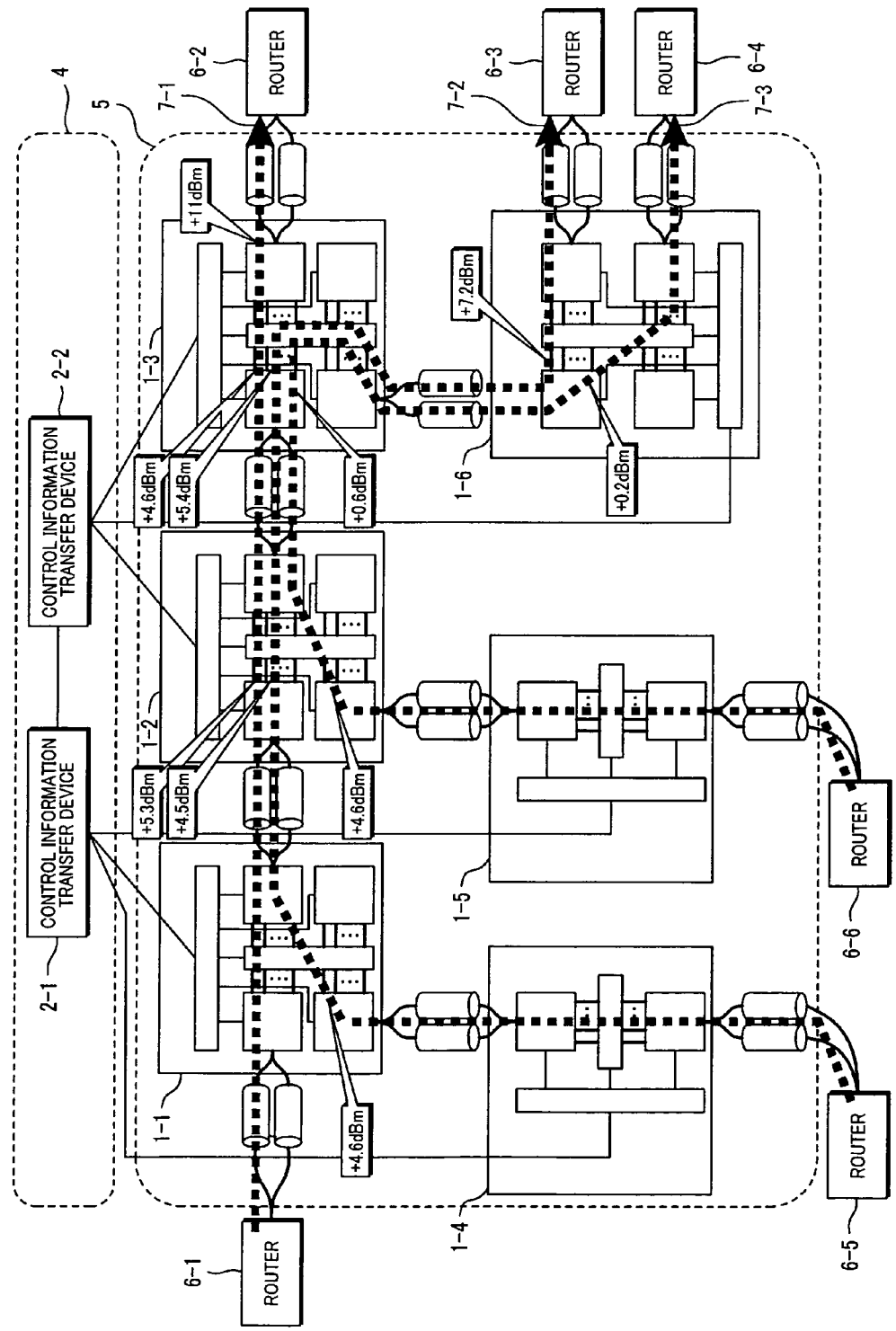
FIG. 6 is a block diagram for explaining an example of optical paths established in an optical network of this embodiment.

The following describes an example of an optical path established in the optical network 5 shown in FIG. 1 in this embodiment with reference to FIG. 6. In FIG. 6, optical paths 7-1 to 7-3 are established. In FIG. 6, to show the optical paths 7-1 to 7-3, characters and reference numerals shown in FIG. 1 in the optical network 5 are omitted.

The optical path 7-1 is established between the routers 6-1 and 6-2 via the optical network equipments 1-1, 1-2, and 1-3. Optical power in the route is +5.3 dBm in the core interface part 1 (104-1) of the optical network equipment (1-2), and +4.6 dBm in the core interface part 1 (104-1) of the optical network equipment 1-3.

The optical path 7-2 is established between the routers 6-5 and 6-3 via the optical network equipments 1-4, 1-1, 1-2, 1-3, and 1-6. Optical power in the route is +4.6 dBm in the core interface part 2 (104-2) of the optical network equipment (1-1), +4.5 dBm in the core interface part 1 (104-1) of the optical network equipment 1-2, +5.4 dBm in the core interface part 1 (104-1) of the optical network equipment 1-3, and +7.2 dBm in the core interface part 1 (104-1) of the optical network equipment 1-6.

The optical path 7-3 is established between the routers 6-6 and 6-4 via the optical network equipments 1-5, 1-2, 1-3, and 1-4. Optical power in the route is +4.6 dBm in the core interface part 2 of the optical network equipment 1-5, +0.6 dBm in the core interface part 1 (104-1) of the optical network equipment 1-2, and +0.2 dBm in the core interface part 1 (104-1) of optical network equipment 1-3.

The optical paths 7-1 and 7-2 pass through the core interface part 1 (104-1) of the optical network equipment 1-2, but optical powers in the paths have mutually different values +5.3 dBm and +4.5 dBm, respectively. Likewise, the optical paths 7-1, 7-2, and 7-3 pass through the core interface part 1 of the optical network equipment 1-3 (104-1), but optical power in the routes have mutually different values +4.6 dBm, +5.4 dBm, and +0.6 dBm, respectively. Furthermore, the optical paths 7-2 and 7-3 pass through the core interface part 1 (104-1) of the optical network equipment 1-6, optical powers in the paths have mutually different values +7.2 dBm and +0.2 dBm, respectively. Although the optical amplifier 41 of the core interface part 104 makes adjustments to cancel out attenuation in a preceding link and the switching part 102, level deviations occur among wavelengths. This is because the passage characteristics of optical devices such as the optical fibers 3, the optical amplifier 41, and the demultiplexer 42 have wavelength dependence.

If the optical amplifier 41 and the optical signal regenerator 34 that can control gain for each wavelength are provided in the core interface parts 104 of the optical network equipments 1, level deviations between wavelengths can be reduced, but the optical network equipments 1 increase in size and become expensive.

In this embodiment, as detailed below, gain adjustment is controlled so that the optical signal regenerator 34 that can control gain for each wavelength can be limitedly disposed in only the edge interface parts 103. This reduces the number of the optical signal regenerators 34 and contributes to reduction in the size and costs of the optical network equipments 1. In the case where the scale of a network becomes large, the optical signal regenerators 34 may be disposed in part of the core interface parts 104. Also in this case, since the core interface parts 104 in which the optical signal regenerator 34 is disposed are limited, the number of the optical signal regenerators 34 is reduced as the whole network. The descriptions below are made on the assumption that the optical paths shown in FIG. 6 have been established. However, reduction of inter-wavelength level deviations performed by a limited number of optical signal regenerators 34 can apply to reservation type path establishment, traffic engineering, and a case in which the paths have been dynamically changed due to recovery from path failure.

Figure 7:
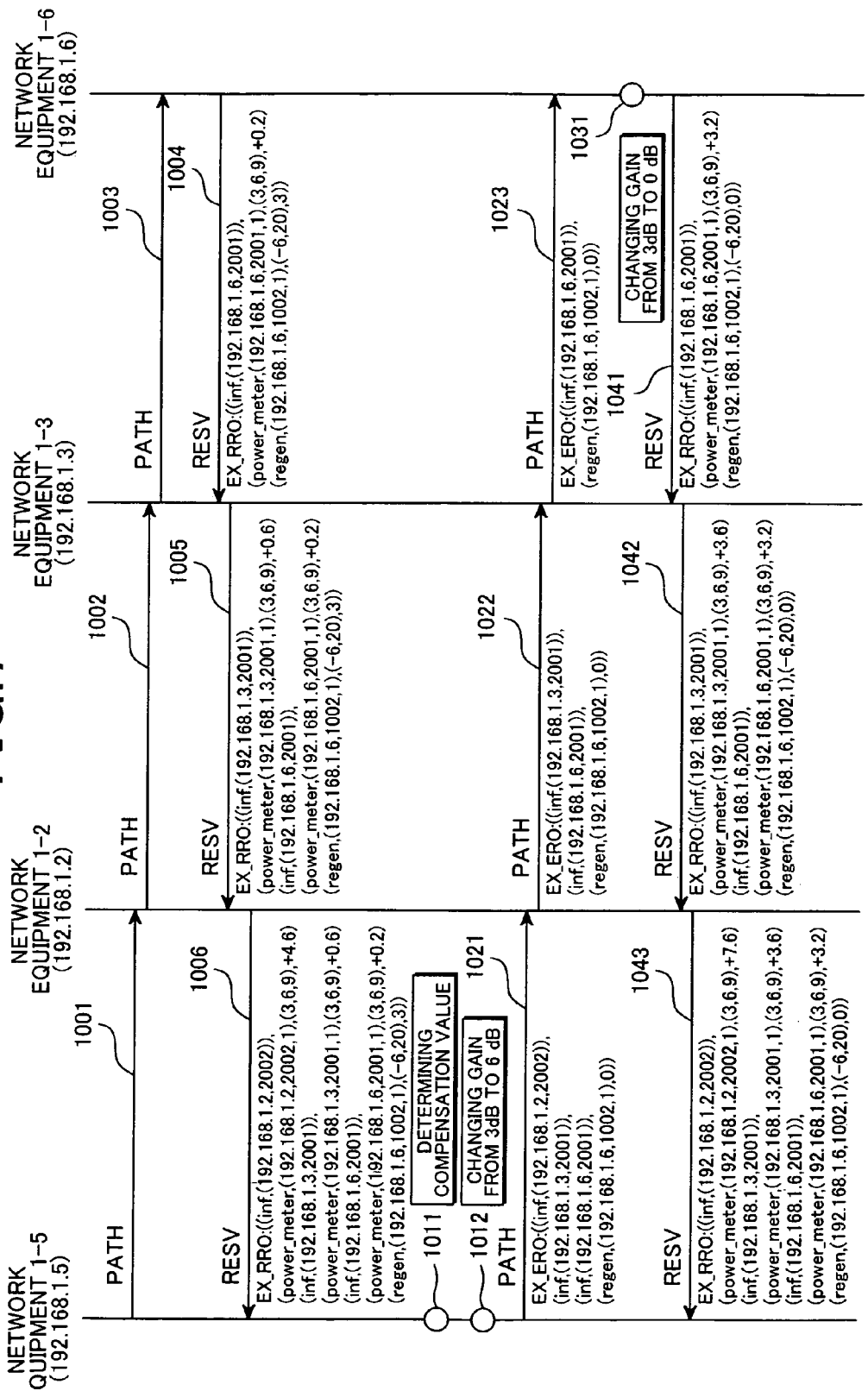
FIG. 7 is a drawing for explaining a compensation control sequence in an optical network of this embodiment.

With reference to FIG. 7, the following describes an example of operation for reducing inter-wavelength level deviations in the core interface part 1 (104) of the optical network equipment 1-3 and the core interface part 1 (104) of the optical network equipment (1-6) in the optical path 7-3 in FIG. 6.

Control information for reducing inter-wavelength level deviations in this embodiment is exchanged between the optical network equipments 1 by including a new object in a PATH message and a RESV (Reserve) message in a refresh sequence after a basic path of GMPLS-extended RSVP-TE is established. The PATH message is a message for requesting the allocation of a communication path from a transmitting side to a receiving side, and the RESV message is a message for indicating a communication path established in response to it from the receiving side to the transmitting side.

The RESV message is provided with an extended record route object according to the present invention (hereinafter referred to as EX_RRO). EX_RRO represents "optical signal measurement and regeneration related information" of an optical path. The optical signal measurement and regeneration related information consists of a set of measurement points of optical signal measuring units through which an optical path passes, the identifiers of the optical signal regenerators and interfaces, the order relation of them on the route, measured values of the optical signal measuring units, "control necessity judgment threshold" indicating conditions for judging the necessity to change compensation values, "target values" being the proper optimum values of measurement results, settable range of the optical signal regenerators, and current setting values.

Like normal RRO (Record Route Object) for adding identification information of passing interfaces in GMPLS-extended RSVP-TE, EX_RRO is added with identification information of optical signal measuring units, control necessity judgment thresholds, and measured values, and further the identification information of the optical signal regenerators, settable ranges, and current setting values. The EX_RRO thus added is transferred from a receiving side to the optical network equipments 1 of an upstream transmitting side.

In the optical path 7-3, in a downstream direction, to request the allocation of a communication path, a PATH message of sequence 1001 is sent from the optical network equipment 1-5 (identifier: 192.168.1.5) to the optical network equipment 1-2 (identifier: 192.168.1.2). Then, a PATH message of sequence 1002 is sent from the optical network equipment 1-2 to the optical network equipment 1-3 (192.168.1.3). Furthermore, a PATH message of sequence 1003 is sent from the optical network equipment 1-3 to the optical network equipment 1-6 (192.168.1.6).

Toward an upstream direction from a receiving side that receives the PATH message to request the allocation of a communication path, a RESV message provided with optical signal measurement and regeneration related information is returned. For example, in a RESV message of sequence 1004 from the optical network equipment 1-6 to the optical network equipment 1-3, an own node value indicating the optical network equipment 1-6 is stored. That is, a first core interface part 104 used is indicated by (inf,(192.168.1.6,2001)). An actually measured value of optical power of a first wavelength selected in the core interface part is +0.2 dBm although the optical power must have a control necessity judgment threshold of +3 to +9 dBm and a target value of +6 dBm. This is represented by (power_meter,(192.168.1.6,2001,1),(3,6,9),+0.2). A current value of the amplifier gain of an optical signal regenerator for the first wavelength in the edge interface part 103 used is 3 dB, wherein the amplifier gain of the optical signal regenerator has a settable range of −6 to 20 dB. This is represented by (regen,(192.168.1.6,1002,1),(−6,20),3). Then, in a RESV message of sequence 1005 from the optical network equipment 1-3 to the optical network equipment 1-2, an own node value indicating the optical network equipment 1-3 is added to the above. That is, a first core interface part 104 used is represented by (inf,(192.168.1.3,2001)). It is represented by (power_meter,(192.168.1.6,2001,1),(3,6,9),+0.6) that an actually measured value of optical power of the first wavelength selected in the core interface part is +0.6 dBm. Furthermore, in a RESV message of sequence 1006 from the optical network equipment 1-2 to the optical network equipment 1-5, an own node value indicating the optical network equipment 1-2 is further added. That is, a second core interface part 104 used is represented by (inf,(192.168.1.2,2002)). It is represented by (power_meter,(192.168.1.2,2002,1),(3,6,9),+4.6) that an actually measured value of optical power of the first wavelength selected in the core interface part is +4.6 dBm.

During addition of information, the connection relationship between the sequences must be held. Ultimately, the optical network equipment (1-5) obtains these values and the connection relationship in the End-to-End section of the path.

The optical network equipment 1-5, which is a start point of the optical path, determines compensation values of the optical path route 1011, and changes settings within its own node if the setting change is judged to be necessary 1012. For example, the equipment 1-5 changes the amplifier gain of the optical signal regenerator of 3 dB to 6 dB. If setting change in downstream nodes is judged to be necessary as a result of the change, the equipment 1-5 creates optical signal compensation control information, stores it in EX_ERO, and transmits a PATH message. For example, the respective core interface parts (inf,(192.168.1.2,2002)), (inf,(192.168.3,2001)), and (inf,(192.168.1.6,2001)) of the optical network equipments 1-2, 1-3, and 1-6 are stored in a PATH message of sequence 1021 from the optical network equipment 1-5 to the optical network equipment 1-2. Furthermore, control information (regen,(192.168.1.6,1002,1),0) is stored to change the amplifier gain 3 dB of the optical signal regenerator of the optical network equipment 1-6 to 0 dB.

An optical network equipment receiving the EX_ERO object changes compensation setting values if control within its own node is necessary, deletes a sub-object of its own node, and downstream transfers the EX_ERO object (sequences 1022 and 1023). The EX_ERO represents compensation values to be newly set in the optical network equipments through which the optical path passes. Optical signal compensation control information is a set of the identifier of a compensator whose settings are to be changed, and a new compensation value.

In the example of the drawing, since the regen sub-object stores only items related to the optical network equipment 1-6, only the optical network equipment 1-6 changes the amplifier gain setting value of the optical signal regenerator 34 from 3 dB to 0 dB (sequence 1031). Since the amplifier gain has increased by 3 dB in the upstream optical network equipment 1-5, in RESV messages of sequences 1041 to 1043 issued from the optical network equipment 1-6 to the upstream optical network equipments, the value of optical power is displayed 3 dB higher than those of sequences 1004 to 1006. That is, optical powers in the optical network equipments 1-6, 1-3, and 1-2 are displayed as +3.2 dBm, +3.6 dBm, and +7.6 dBm, respectively. Subsequently, the above operations are repeated.

In the network configuration shown in FIG. 6, since the optical signal regenerator 34 of wavelength unit is included in only the edge interface part 103, only the optical network equipment 1-6 stores the regen sub-object in the EX_ERO object. However, when intermediate nodes include the optical signal regenerator 34 of wavelength unit, the nodes may add information. For example, the optical network equipment 1-3 may add the regen sub-object. In this case, for example, the starting node specifies a compensation value for it in the EX_ERO object. Alternatively, instead of the End-to-End section, the optical network equipment 1-3 may control compensation values in a section from the optical network equipment 1-3 to the end point of the optical path according to judgment of the equipment 1-3.

Figure 8:
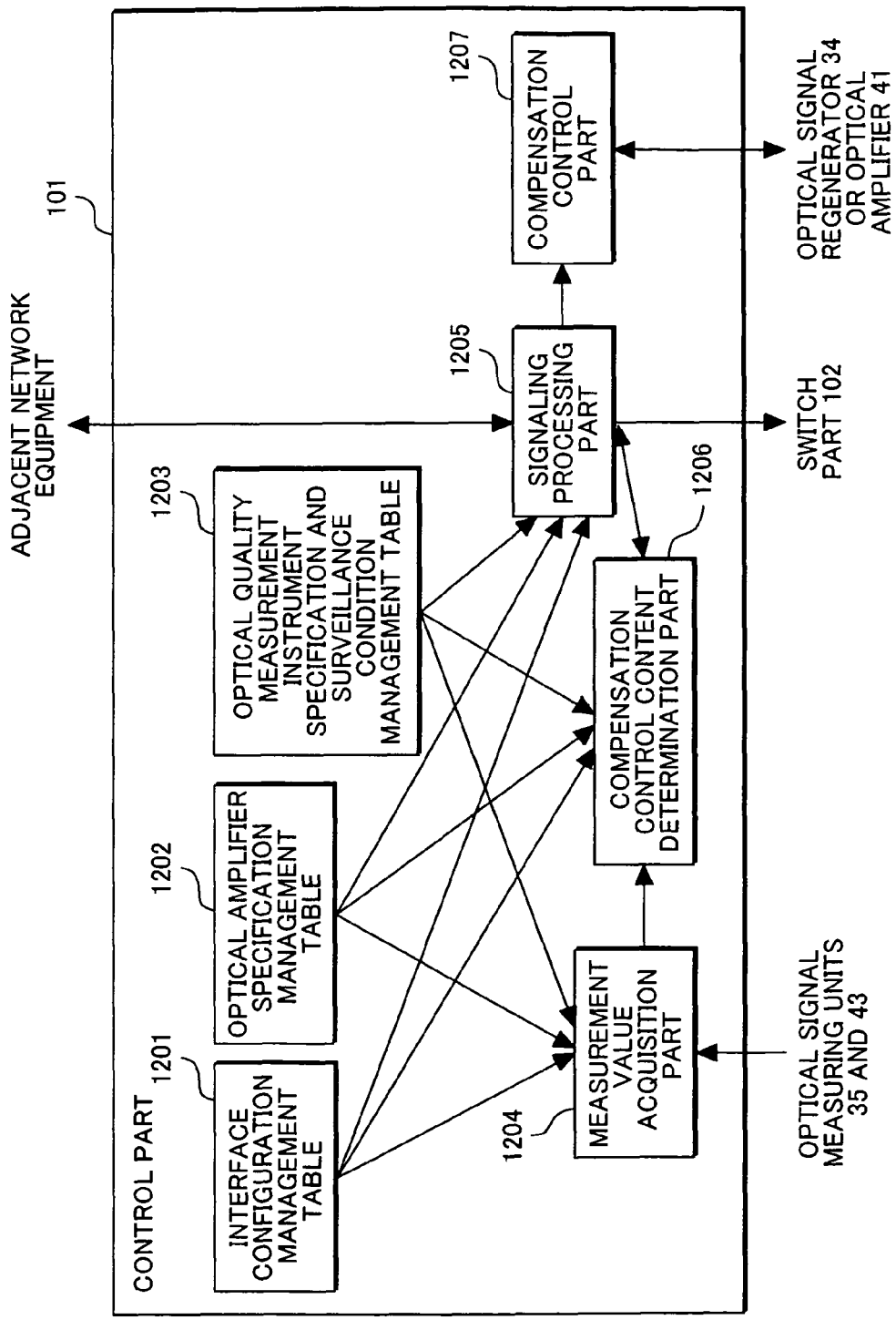
FIG. 8 is a drawing for explaining the software structure of a control part used in an optical network equipment of this embodiment.

With reference to FIG. 8, the following describes the software structure of the control part 101 that creates signal compensation control information of the present invention to perform compensation control. The software is formed by a program 1121 that prescribes an operation procedure of the CPU 111 in FIG. 5, and data 1122. The software of the control part 101 comprises an interface configuration management table 1201, an optical amplifier specification management table 1202, an optical quality measurement instrument specification and surveillance condition management table 1203, a measurement value acquisition part 1204, a signaling processing part 1205, a compensation control content determination part 1206, and a compensation control part 1207.

The interface configuration management table 1201 holds a connection relationship among the interface parts 103 and 104, the optical signal regenerator 34, and the optical signal measuring units 35 and 43 within an own equipment. The optical amplifier specification management table 1202 holds information about the optical amplifier 41 and the optical signal regenerator 43 within an own equipment, such as settable parameters and settable ranges. The optical quality measurement instrument and surveillance condition management table 1203 holds information about the optical signal measuring units 35 and 43 within an own equipment, such as target values of the measuring units, and thresholds for judging whether to perform control by parameter change. Examples of the interface configuration management table 1201, the optical amplifier specification management table 1202, and the optical quality measurement instrument and surveillance condition management table 1203 will be described later with reference to FIGS. 10 to 12.

The measurement value acquisition part 1204 acquires measured values from the optical signal measuring units 35 and 43, and provides the measured values according to a request from the signaling processing part 1205. When a value changes beyond a threshold, it notifies the signaling processing part 1205 that the threshold has been exceeded, regardless of the existence or absence of a request from the signaling processing part 1205.

The compensation control part 1207 updates or acquires operation parameters of the optical signal regenerator 34 and the optical amplifier 41 according to a request from the signaling processing part 1205, and provides them to the signaling processing part 1205.

The compensation control content determination part 1206, according to a request from the signaling processing part 1205, derives optical signal compensation control information by using the optical signal measurement and regeneration related information, and provides it to the signaling processing part 1205. Details of compensation quantity determination processing of the compensation control content determination part 1206 will be given later with reference to FIG. 13.

The signaling processing part 1205 exchanges PATH/RESV messages according to the GMPLS-extended RSVP-TE standards, and controls the switching part 102 according to the messages, thereby establishing/opening an optical path. When transmitting and receiving the RESV messages, the signaling processing part 1205 refers to the optical amplifier specification management table 1202 and the optical quality measurement instrument and surveillance condition management table 1203 to derive information about the optical signal regenerator 34 and the optical signal measuring units 35 and 43 that are related to an optical path being processed, and acquires a current setting value from the optical signal regenerator 34 via the compensation control part 1207 and measured values from the optical signal measuring units 35 and 43 via the measurement value acquisition part 1204. Furthermore, by referring to the interface configuration management table 1201, the part 1205 derives a connection relationship among the optical signal regenerator 34, the optical signal measuring units 35 and 43, and the interface parts 103 and 104, and derives optical signal measurement and regeneration related information by arranging information about the optical signal regenerator 34 and the optical signal measuring units 35 and 43, the current setting value, and the measured values in that order. The signaling processing part 1205 includes the derived optical signal measurement and regeneration related information in a RESV message as an EX_RRO object and transfers it to the upstream optical network equipments 1 on the optical path.

On receiving EX_RRO, the signaling processing part 1205 instructs the measurement value acquisition part 1204 to judge whether compensation operation is required. When it is judged that compensation operation is required, the part 1205 instructs the compensation control part 1207 to control the optical signal regenerator 34 within the own equipment, based on the optical signal measurement and regeneration related information received from the measurement value acquisition part 1204, and includes the optical signal measurement and regeneration related information in a PATH message as an EX-RRO object and transfers it to the downstream optical network equipments 1.

Figure 9:
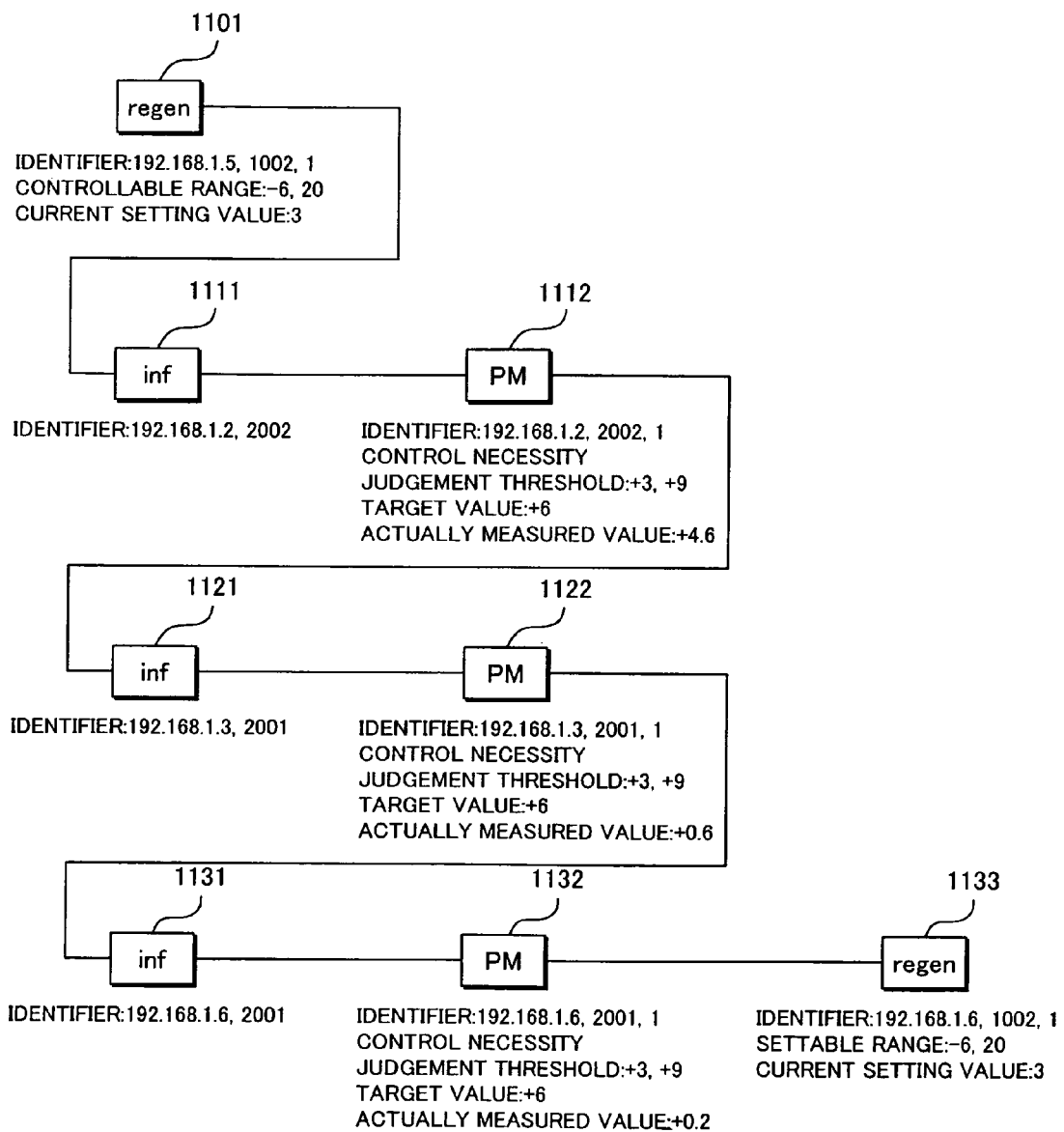
FIG. 9 is a drawing for explaining a connection relationship among optical signal regenerators, optical measurement parts, and interfaces.

The contents of the optical signal measurement and regeneration related information acquired by the optical network equipment 1-5 in the sequence 1006 of FIG. 7 is described with reference to FIG. 9.

The optical network equipment 1-5, from EX_ERO of sequence 1006, can immediately recognize that there are downstream the interface part 104 (1111) of identifier (192.168.1.2,2002), the value of the optical power meter 1112 being the optical signal measuring unit 43 for the first wavelength, the interface part 104 (1121) of identifier (192.168.1.3,2001), the value of the optical power meter 1122 of identifier (192.168.1.3,2001,1) being the optical signal measuring unit 43 for the first wavelength, the interface part 104 (1131) of identifier (192.168.1.6,2001), the optical power meter 1132 of identifier (192.168.1.6,2001,1), and the optical signal regenerator 34 (1133) of identifier (192.168.1.6,1002,1) for the first wavelength, and these exist in that order.

The optical network equipment 1-5 can recognize that the optical signal regenerator 34 (1101) exists in an upstream portion (the own node in this case) of the interface part 104 (1111), by consulting session information of GMPLS-extended RSVP-TE of the own node, the interface configuration management table 1201, and the optical amplifier specification management table 1202. The identifier of the optical signal regenerator (34) is (192.168.1.5,1002,1). With respect to the optical signal regenerators (1101, 1133), a settable range (−6 dB to 20 dB), and a current setting value (3 dB) can be recognized.

For the optical power meters (1112, 1122, 1132), control necessity judgment thresholds (+3 dBm, +9 dBm), a target value (+6 dBm), and actually measured values (+4.6 dBm, +0.6 dBm, +0.2 dBm, respectively) can be recognized. The actually measured values are compared with the control necessity judgment thresholds, and when the former is within a range of the latter, it can be determined that control is unnecessary; when out of range, it can be judged that it is necessary to change parameters of the amplifier gain of the optical signal regenerator 34. In the example of this drawing, in two optical power meters (1122, 1132), the actually measured values are outside the range of the control necessity judgment thresholds, and it is judged that it is necessary to change the parameters of the optical signal regenerator 34.

To change these actually measured values, it is necessary to change parameters of the optical signal regenerators that exist in the upstream side. In the example of the drawing, it can be recognized that parameters of the optical signal regenerator 1101 must be changed. It can be recognized that changing the parameters of the optical signal regenerator 1101 would influence the optical power meters (1112, 1122, 1132) and components further downstream from the optical signal regenerator 1133. From the above, it is recognized that, in the optical signal regenerator 1133, the parameters of the optical signal regenerator 1133 should be changed to cancel out the influence of the optical signal regenerator 1101.

The following describes the structure of the interface configuration management table 1201 with reference to FIG. 10. The interface configuration management table 1201 holds a connection relationship among the interface parts 103 and 104, the optical signal regenerator 34, and the optical signal measuring units 35 and 43 within an own equipment.

The interface configuration management table 1201 has an upstream device column 701 and a downstream device column 702. The upstream device column 701 is further divided into a type column 7011 and a local identifier column 7012.

Likewise, the downstream device column 702 is further divided into a type column 7021 and a local identifier column 7022.

An example of stored values of this drawing shows the interface configuration management table 1201 held by the optical network equipment 1-4 in FIG. 1, and shows a connection relationship among optical signal measuring units 35 and 43, and the optical signal regenerator 34 of all edge interface parts 103 and core interface parts 104 within the optical network equipment 1-4. Specifically, in a connection relationship 703, a connection relationship of optical measuring units 3501 to 3532 respectively corresponding to wavelengths 1 to 32 ($\lambda1$ to $\lambda32$) of a first (1001) edge interface part 103-1 is shown. In a connection relationship 704, a connection relationship of optical measuring units 3533 to 3564 respectively corresponding to wavelengths 1 to 32 ($\lambda1$ to $\lambda32$) of the first (1001) edge interface part 103-1 is shown. In a connection relationship 705, a connection relationship of optical signal measuring units 3533 to 3564 respectively corresponding to the optical signal regenerators 34-01 to 34-32 is shown. In a connection relationship 706, a connection relationship of optical measuring units 4301 to 4332 respectively corresponding to wavelengths 1 to 32 ($\lambda1$ to $\lambda32$) of a first (2001) core interface part 104-1 is shown. In a connection relationship 707, a connection relationship of optical measuring units 4333 to 4364 respectively corresponding to wavelengths 1 to 32 ($\lambda1$ to $\lambda32$) of the first (2001) core interface part 104-1 is shown.

Figure 11:
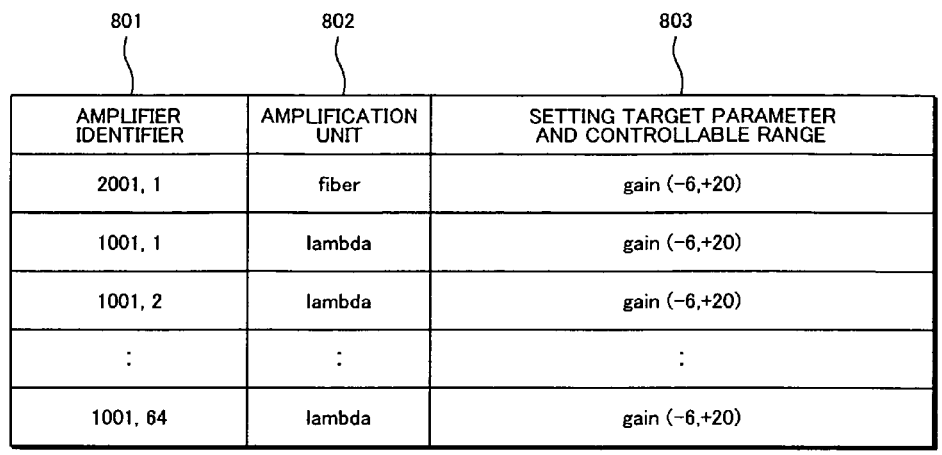
FIG. 11 is a drawing for explaining the structure of optical amplifier specification management table.

The following describes the structure of the optical amplifier specification management table 1202 with reference to FIG. 11. The optical amplifier specification management table 1202 holds information about the optical amplifier 41 within an own equipment and an optical amplifier owned by the optical signal regenerator 34, such as settable parameters and settable ranges.

The optical amplifier specification management table 1202 has an amplifier identifier column 801 for identifying an optical amplifier, an amplification unit column 802 for indicating whether an optical signal from optical fibers (fiber) or an optical signal for each wavelength (lambda) is to be amplified, and a column 803 for control target parameters and controllable ranges. In the amplifier identifier column 801, the optical amplifier (41) of the first (2001) core interface 104-1, and optical amplifiers of the first (1001) optical signal regenerators 34-01 to 34-64 are shown in this order from above.

Figure 12:
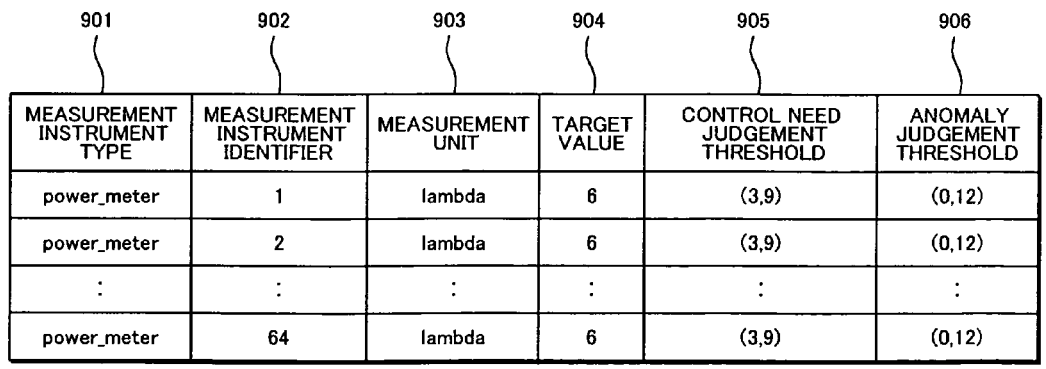
FIG. 12 is a drawing for explaining the structure of an optical quality measurement instrument and surveillance condition management table.

The following describes the structure of the optical quality measurement instrument and surveillance condition management table 1203 with reference to FIG. 12. The optical quality measurement instrument and surveillance condition management table 1203 holds information about the optical signal measuring units within an own equipment, such as target values of the measuring units, and thresholds for judging whether to perform control by parameter change.

The optical quality measurement instrument and surveillance condition management table 1203 has a measurement instrument type column 901 for indicating the type of a measuring unit to perform measurement, a measurement instrument identifier column 902 for indicating the distinction between the optical signal measuring units 35 and 43, a measurement unit column 903, a target value column 904, a control necessity judgment threshold column 905, and an anomaly judgment threshold column 906.

Figure 13:
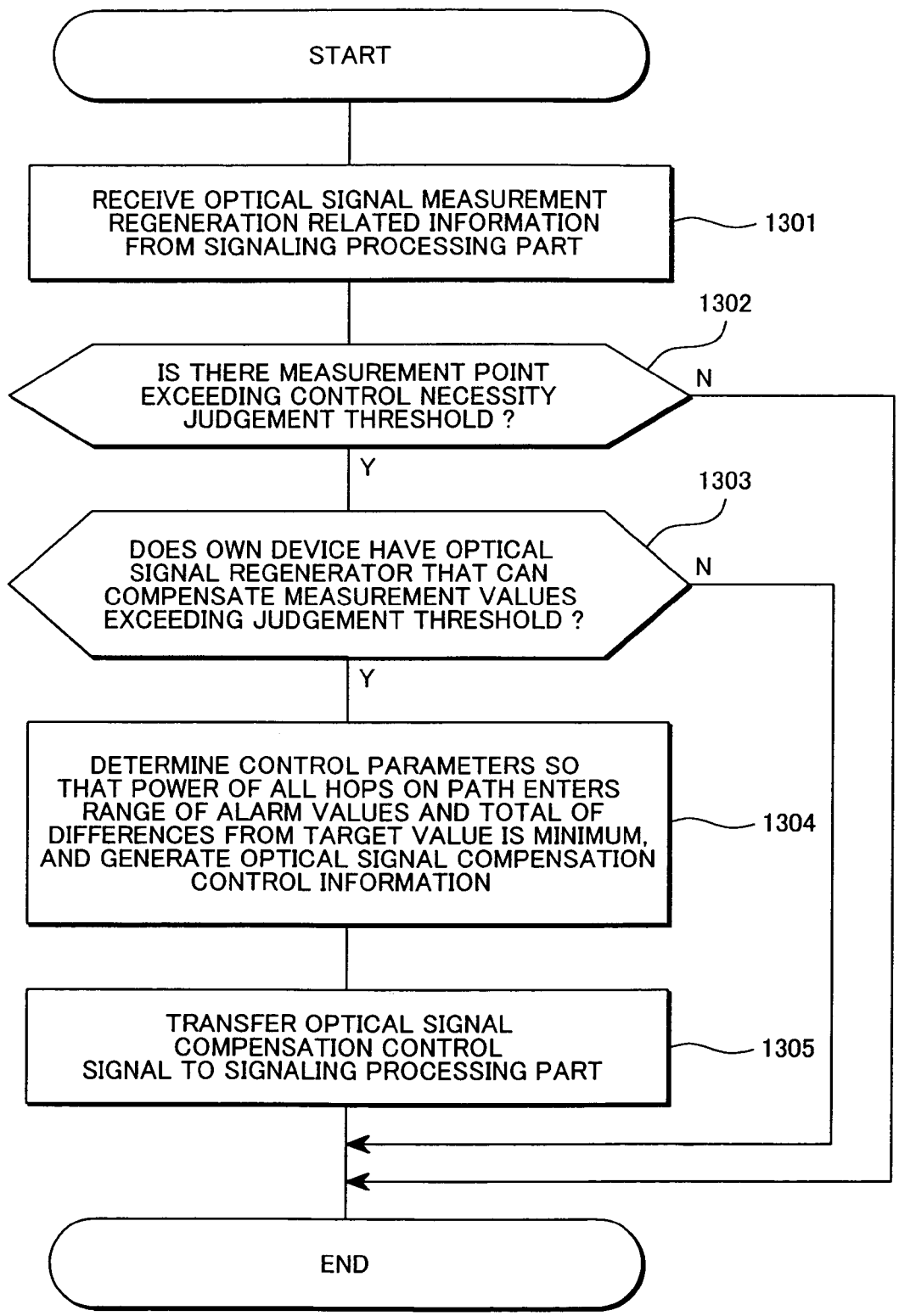
FIG. 13 is a flowchart for explaining compensation amount determination processing.

The following describes compensation amount determination processing by the compensation control content determination part 1206 in the sequence 1011 of FIG. 7, with reference to FIG. 13. This processing is started when EX_RRO is included in a RESV message received by the signaling processing part 1205.

The compensation control content determination part 1206 receives optical signal measurement and regeneration related information from the signaling processing part 1205 (1301), and judges whether there is a measurement point exceeding control necessity judgment thresholds (1302). If there is no such a measurement point, the processing terminates, and otherwise, the part 1206 determines whether the own equipment has an optical signal regenerator that can compensate a measured value exceeding the judgment thresholds, using the optical amplifier specification table 1202 (1303). If the own equipment does not have such the optical signal regenerator, the processing terminates, and otherwise, the part 1206 determines control parameters so that the powers of all nodes on the route are within a warning value range and the sum of deviations from a target value is minimum, and creates optical signal compensation control information (1304). The part 1206 transfers the optical signal compensation control information to the signaling processing part (1205).

In this embodiment, a compensation object is an optical power, and therefore control parameters are amplifier gain. However, the present invention can include, as other compensation objects, S/N ratio, chromatic-dispersion of group velocity, polarization mode dispersion, dispersion mode delay, and Q factor. In that case, control parameters corresponding to them are set.

As has been described above, by this embodiment, optical signal characteristic deviations between wavelengths can be solved without having to include compensators that compensate optical signal characteristics for each wavelength, for example, optical signal regenerators in all network equipments. Even when a path is dynamically changed because of reserved path establishment, traffic engineering, and recovery from path failure, optical signal characteristic deviations between wavelengths can be solved.

It is further understood by those skilled in the art that the foregoing description is a preferred embodiment of the disclosed device and that various changes and modifications may be made in the invention without departing from the spirit and scope thereof.

What is claimed is:

1. An optical network equipment for constituting an optical network that uses an optical fiber as transmission media, comprising:
    an interface part connected to the optical fiber;
    a switching part that sets a communication path by switching over the connectivity to an input or output optical signal of the interface part;
    an optical signal measuring unit that measures a characteristic of the optical signal; and
    a control part that controls an operation of the switching part based on a control message for establishing the communication path according to a communication path establishment control protocol;
    wherein the optical network equipment transmits the control message of the communication path establishment control protocol to another optical network equipment along the communication path, and
    wherein the interface part transmits a measured value obtained by the optical signal measuring unit to the other optical network equipment using the control message of the communication path establishment control protocol.

2. The optical network equipment according to claim 1, wherein the optical network equipment is disposed at a start point in the communication path, and transmits a command for controlling a parameter of the other optical network equipment by the control message transmitted using the communication path establishment control protocol according to the obtained measured value.

3. The optical network equipment according to claim 1,
wherein the optical network equipment is disposed at a start point in the communication path, and obtains a parameter range of the type column AND/OR being controllable by an optical signal regenerator in the optical network equipment by the control message transmitted using the communication path establishment control protocol.

4. The optical network equipment according to claim 1, further comprising:
an optical signal regenerator that compensates the characteristic of the optical signal by changing a control parameter,
wherein the control parameter is set to the optical regenerator using the communication path establishment control protocol.

5. The optical network equipment according to claim 4,
wherein a value of the control parameter is determined according to the measured value transmitted to the other optical network equipment.

6. The optical network equipment according to claim 1,
wherein the downstream optical network equipment on the communication path being set transmits optical signal measurement and regeneration related information toward the upstream optical network equipment using the communication path establishment control protocol, and
wherein the upstream optical network equipment receives the optical signal measurement and regeneration related information being cumulatively added in the optical network equipment on the communication path.

7. The optical network equipment according to claim 6,
wherein the optical signal measurement and regeneration related information consists of a set of respective identifiers of the measuring point of the optical signal measuring units and optical signal regenerators and interface parts on the communication path being set, an order relation on the communication path, the measured values of the optical signal measuring units, a control necessity judgment threshold indicating a condition for judging the necessity to change compensation values, target value being the proper optimum values of measurement results, and a settable range of the optical signal regenerators and current setting values.

8. The optical network equipment according to claim 6,
wherein the upstream optical network equipment judges whether an optical signal regenerator that can compensate the measured value exceeding a control necessity judgment threshold is equipped if the measured value exceeding the control necessity judgment threshold is contained in the received optical signal measurement and regeneration related information, and determines a control parameter and generates the optical signal measurement and regeneration related information and changes the setting of the own equipment if the optical signal regenerator is equipped.

9. The optical network equipment according to claim 8,
wherein the upstream optical network equipment transmits the optical signal measurement and regeneration related information using the communication path establishment control protocol to the downstream optical network equipment if the setting change of the downstream optical network equipment is necessary when the own equipment is changed based on the optical signal measurement and regeneration related information.

10. An optical network system equipped with at least a first optical network equipment and a second optical network equipment in a network;
wherein each of the optical network equipments constitute an optical network that uses an optical fiber as transmission media; and
wherein the first optical network equipment comprises:
an interface part connected to the optical fiber;
a switching part that sets a communication path by switching over the connectivity to an input or output optical signal of the interface part;
an optical signal measuring unit that measures a characteristic of the optical signal; and
a control part that controls operation of the switching part based on a control message for establishing the communication path according to a communication path establishment control protocol,
wherein the first optical network equipment transmits the control message of the communication path establishment control protocol to the second optical network equipment along the communication path, and
wherein the interface part transmits a measured value obtained by the optical signal measuring unit to the second optical network equipment using the control message of the communication path establishment control protocol.

11. The optical network system according to claim 10,
wherein the downstream optical network equipment on the communication path being set transmits optical signal measurement and regeneration related information toward the upstream optical network equipment using the communication path establishment control protocol, and
wherein the upstream optical network equipment receives the optical signal measurement and regeneration related information being cumulatively added in the optical network equipment on the communication path.

12. The optical network system according to claim 11,
wherein the optical signal measurement and regeneration related information consists of a set of respective identifiers of the measuring point of the optical signal measuring units and optical signal regenerators and interface parts on the communication path being set, an order relation on the communication path, the measured values of the optical signal measuring units, a control necessity judgment threshold indicating a condition for judging the necessity to change compensation values, target value being the proper optimum values of measurement results, and a settable range of the optical signal regenerators and current setting values.

13. The optical network system according to claim 12,
wherein the upstream optical network equipment judges whether an optical signal regenerator that can compensate the measured value exceeding a control necessity judgment threshold is equipped if the measured value exceeding the control necessity judgment threshold is contained in the received optical signal measurement and regeneration related information, and determines a control parameter and generates the optical signal measurement and regeneration related information and changes the setting of the own equipment if the optical signal regenerator is equipped.

14. The optical network system according to claim 13,
wherein the upstream optical network equipment transmits the optical signal measurement and regeneration related information using the communication path establishment control protocol to the downstream optical network equipment if the setting change of the downstream optical network equipment is necessary when the own equipment is changed based on the optical signal measurement and regeneration related information.

* * * * *